United States Patent [19]

Zach et al.

[11] 3,760,436

[45] Sept. 25, 1973

[54] SUSPENSION SYSTEM FOR VEHICLE MOUNTED BED

[75] Inventors: Donald J. Zach; Martin T. Pilachowski, both of Greendale, Wis.

[73] Assignee: Universal Oil Products Company, Des Plaines, Ill.

[22] Filed: Nov. 5, 1971

[21] Appl. No.: 195,954

[52] U.S. Cl................................ 5/118, 5/63, 5/103, 108/136
[51] Int. Cl............................................. A47c 19/00
[58] Field of Search...................... 5/118, 108, 109, 5/103, 63; 296/24, 23; 108/147

[56] References Cited
UNITED STATES PATENTS

| | | | |
|---|---|---|---|
| 3,612,599 | 10/1971 | Sternberg................................ | 5/118 |
| 3,282,566 | 11/1966 | Clarke ..................................... | 5/63 |
| 430,616 | 6/1890 | Brewer...................................... | 5/103 |
| 2,833,587 | 5/1958 | Saunders.................................. | 5/63 |
| 2,968,817 | 1/1961 | Jacobs et al. ............................ | 5/63 |
| 3,110,476 | 11/1963 | Farris........................................ | 108/147 |
| 3,472,183 | 10/1969 | Goodman ................................. | 5/63 |
| 3,125,767 | 3/1964 | Griggs et al.............................. | 5/109 |
| 3,439,363 | 4/1969 | Meeks....................................... | 5/109 |
| 3,299,447 | 1/1967 | Dome ....................................... | 5/118 |
| 3,371,359 | 3/1968 | Dome ....................................... | 5/118 |

Primary Examiner—Francis K. Zugel
Assistant Examiner—Darrell Marquette
Attorney—James R. Hoatson, Jr. et al.

[57] ABSTRACT

Suspension system for vehicle-mounted beds provides both fore and aft isolation and vertical isolation from pitch and vertical vibrations of the vehicle. The main frame of the suspension is mounted for vertical isolation movement relative to the frame of the vehicle by means of an air spring biased scissor-type linkage. Fore and aft isolation movement is provided by pendulously suspending the mattress support frame from pivoted links attached to the main suspension frame. The system provides especially good shock isolation for short wheel-base truck cabs of the cab over engine type where the bed is usually located at a considerable distance above the vehicle frame.

10 Claims, 3 Drawing Figures

PATENTED SEP 25 1973 3,760,436

SUSPENSION SYSTEM FOR VEHICLE MOUNTED BED

BACKGROUND OF THE INVENTION

It has become common practice to provide sleeping compartments in vehicles such as trucks. Where only a single driver is assigned to the truck a simple mattress would of course provide sufficient comfort since the truck would not be moving while the driver was sleeping. However, it is often desirable to assign two drivers to a truck in order to move goods more quickly and to obtain maximum utilization of the truck. Although highways have been improved so that they are very smooth and so that a vehicle can drive for many hours without stopping, the trucks which ride along them still experience continual vibrations, including vertical bouncing and pitch movements of a magnitude which would make it almost impossible to sleep on an ordinary non-suspended mattress. Although many structures have been designed to isolate the person lying on the mattress from the vibrational and other movements of the truck, such structures, as exemplified by U.S. Pat. Nos. 3,299,447 and 3,371,359, commonly provide isolation in only a vertical direction. Vertical vibrations are certainly important movements which must be isolated against since they may be of substantial magnitude. However, fore and aft or pitching movements of considerable magnitude also take place in a truck, and particularly so in a cab over engine truck or tractor unit where the cab extends well above the pitch center of the chassis. Since a mattress in the sleeper bunk of such a cab can be eight feet or more above the road, it is easy to visualize that pitching of the cab due to flexing of the frame as well as up and down movements of the front wheels relative to the rear wheels will be amplified tremendously at the height of the bed above the road and will cause the mattress and its occupant to continually move fore and aft.

Although fore and aft isolation mechanisms are available for isolating such pitching movements from truck seats, we are not aware of any mattress supports which provide such isolation. One such isolator system for a seat used a principle found in porch gliders of having a frame fixed relative to the floor from which the seat support frame swings, the seating surface being separated from the seat support frame by a resilient suspension.

SUMMARY OF THE INVENTION

It is among the objects of this invention to provide a mattress suspension system for a moving vehicle which is simple and economical to manufacture and yet capable of isolating the mattress and a person resting upon it from most of the vertical as well as fore and aft vibrations of the vehicle.

These and other objects are attained by the present invention wherein a main bed suspension frame which is preferably of tubular construction is supported for vertical resilient movement relative to the floor of the vehicle's sleeping compartment. A mattress support box or frame is supported by a pair of parallel pivoted links pinned to the main bed suspension frame at each of its ends. The parallel links permit the mattress to swing back and forth like a pendulum with its upper surface parallel to the floor of the sleeping compartment to isolate the mattress from fore and aft or horizontal vibrations while at the same time the vertical suspension mechanism isolates the mattress from vertical vibrations.

The parallel link pendulum type fore and aft isolation mechanism preferably has links which provide a natural frequency which permits good isolation of the usual fore and aft movement vibrations of a truck. Since space in the sleeping compartment of a truck cab is usually extremely limited, the total amount of horizontal movement permitted by the suspension is limited to about 3 inches. A lock-out mechanism is provided for preventing fore and aft movement of the bed when desired.

The suspension for vertical movement isolation may be one of a number of types but preferably comprises a scissors linkage having one link attached to the vehicle floor at one of its ends and adapted to slide in a track on the suspension frame at its other end. The second link is affixed to the suspension frame at one end and adapted to slide in a track on the vehicle floor at its other end. A gas spring, which may be adjusted for the weight of different occupants to keep the bed centered in a "ride zone," is positioned between the vehicle floor and the suspension frame. In a preferred embodiment of the invention, a 4 inch range of vertical isolation has proven to be quite satisfactory. By sizing the air spring system it is possible to provide a natural frequency which provides good isolation from vertical vibration.

The foregoing and other objects, features, and advantages will be apparent from the following more particular description of a preferred embodiment thereof, as illustrated in the accompanying drawings.

DESCRIPTION OF THE PREFERRED EMBODIMENTS

Figure 1:
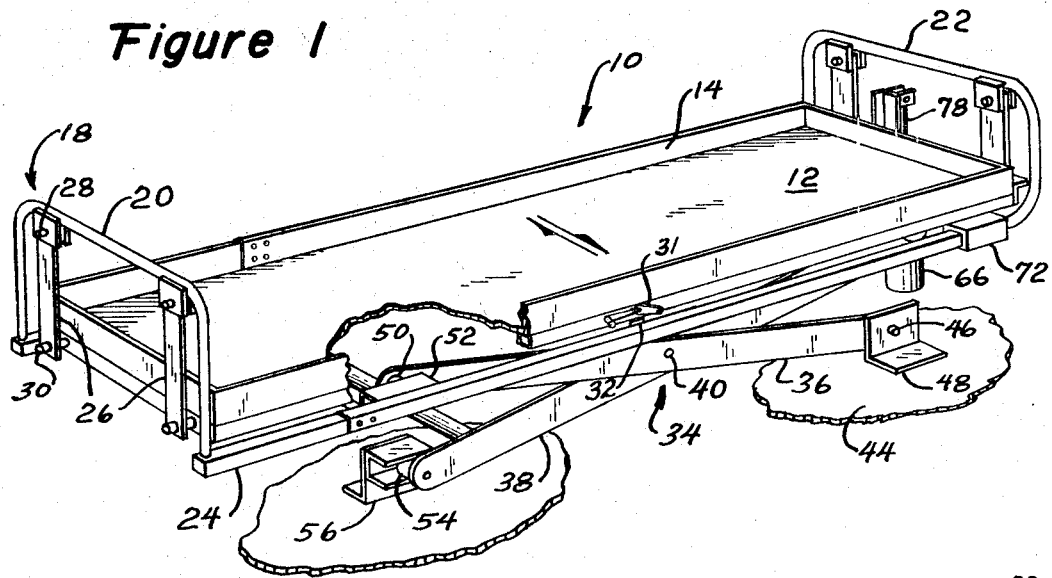
FIG. 1 is a perspective view of the improved suspension system.
Figure 2:
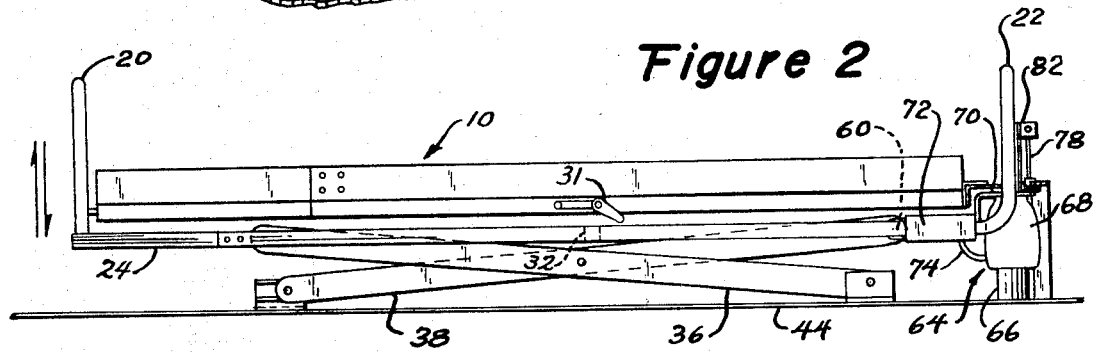
FIG. 2 is a front plan view of the suspension system shown in FIG. 1.
Figure 3:
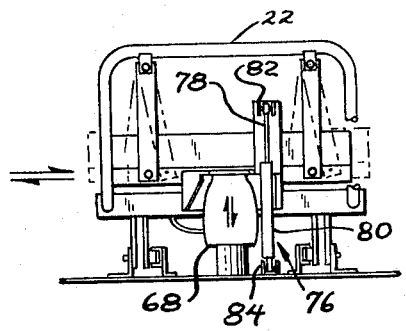
FIG. 3 is a plan view of the right end of the suspension system shown in FIG. 1.

In FIG. 1, the improved vehicle sleeper bunk and suspension system therefore indicated generally at 10 includes a mattress support box 12 having side walls 14 for retaining a mattress (not shown). If desired, the front and rear facing walls can be made of greater height than the remaining walls or can include upward extensions to provide protection to the occupant against rolling out of the bed in case of sudden stops of the vehicle. The mattress support box 12 is mounted for fore and aft movement relative to a frame structure indicated generally at 18 which is in turn relatively movable vertically relative to the frame of the vehicle as will be hereinafter described. The movable frame structure 18 includes end frame portions 20, 22 which are connected together by a bottom frame portion 24 into an integral unit. A pair of pivoted link members 26 mounted to the upper portions of each of the end frames 20 and 22 by means of pins 28 and to the bottom frame portion 24 by means of pivot pins 30 permit the mattress support box 12 to pivotally swing fore and aft relative to the frame structure 18 and the floor or frame portion 44 of the vehicle. A range of movement of the frame portion 24 of about 3 inches has been found to be effective. The pivot links 26 permit the mattress support box 12 to behave like pendulum whose natural period of oscillation depends on the length of the pendulum. It has been found that by using pivot links 26 having a length of approximately 10 inches that the mattress support box 12 will have a natural frequency of approximately 1 Hz. Since this frequency is considerably less than the normal pitch frequency of the vehicle, usually about 2.5 Hz or higher, the occupant of the sleeper bunk 10 will be effectively isolated from fore and aft motions of the vehicle.

Since it is sometimes desirable to lock out the fore and aft isolator mechanism, a locking lever and handle 31 is mounted on the side rail 14 for engagement with a bracket 32 on the frame 24.

Isolation of the sleeper bunk 10 from vertical vibratory motions of the vehicle may be provided by a scissors linkage indicated generally at 34 comprising a first link member 36, and a second link member 38 pivotally connected to the first by a pivot pin 40. The movable frame structure 18 is mounted for vertical movement relative to the floor or frame 44 of the vehicle by pivotally attaching one end of first link member 36 by means of a pivot pin 46 to a floor bracket 48. The opposite end of the first link 36 is provided with roller member 50 which is mounted in a roller guide 52 fixed to the bottom frame member 24. The second link 38 has a roller 54 mounted on its lower end in floor bracket and roller guide member 56. The upper end of the second link member 38 is pivotally attached by a pivot connection 60 to the bottom frame portion 24 of the movable frame structure 18. Vertical movement of the scissors linkage 34 is controlled and restrained by a gas spring assembly indicated generally at 64.

The gas spring 64 includes a piston member 66 attached to the floor 44 of the vehicle and a cylinder portion 68 attached at its upper end to bracket member 70 which is affixed to the movable frame structure 18. The internal detail of the gas spring will not be described since such devices are commercially available and are conventionally used in seat suspensions. Furthermore, a specific description of a means for adjusting the gas spring 64 to accommodate the weight of different occupants of the sleeper bunk will not be described since such structures are conventional. In the embodiment of the invention described herein the gas spring offers a range of vertical movement of about 4 inches. The gas spring should be adjusted to the weight of an occupant so that he will be approximately centered in the "ride zone" of the vertical suspension when the vehicle is at rest. Attached to and integral with the bottom frame 24 is a gas reservoir 72 connected to the gas spring cylinder 68 by means of a length of tubing 74. The purpose of the reservoir 72 is to store a sufficient amount of gas to permit the gas spring 64 to operate at a natural frequency of about 1 Hz. In addition to the gas spring 64 the vertical motion isolating suspension includes a shock absorber indicated generally at 76 for damping the vertical motion of the frame structure 18. The shock absorber 76 includes a pistion portion 78 and a cylinder portion 80. The piston 78 is attached to a bracket 82 which is fixed to the movable frame structure 18 while the cylinder 80 is attached by means of a floor bracket 84 to the frame 44 of the vehicle.

I claim as my invention:

1. A bed construction for a moving vehicle comprising:
   a. a movable frame including horizontal support portions at each end thereof,
   b. resilient support means connected to said movable frame and to the frame of the vehicle for permitting said movable frame to move in a vertical direction relative to the frame of said vehicle;
   c. a mattress support member including horizontal support portions at each end thereof; and
   d. a pair of rigid vertical link members pivotally connecting the ends of said support portions at each end of the bed and cooperating therewith to form a parallelogram linkage for penduously supporting said mattress support member for fore and aft movement relative to the vehicle.

2. A bed construction for a moving vehicle in accordance to claim 1 wherein said resilient support means includes a gas spring.

3. A bed construction for a moving vehicle in accordance with claim 2 wherein said resilient support means further includes linkage means.

4. A bed construction for a moving vehicle in accordance with claim 3 wherein said linkage means includes a scissors linkage comprising a pair of link members pivoted to each other intermediate their ends and with one of said link members being pivoted to the vehicle frame at one of its ends and slidably mounted to the mattress support member at its other end while the other link member is pivoted to the mattress support member at one end and mounted for sliding movement relative to the vehicle frame at its other end.

5. A bed construction for a moving vehicle in accordance with claim 1 wherein said vertical link members have a length sufficient to permit said mattress support member to oscillate at a natural frequency which is less than the natural pitch frequency of a vehicle in which the bed is mounted.

6. A bed construction for a moving vehicle in accordance with claim 5 wherein said vertical link members have a length sufficient to permit said mattress support member to oscillate at a natural frequency of less than 2 Hz.

7. A bed construction for a moving vehicle in accordance with claim 5 wherein said vertical link members have a length sufficient to permit said mattress support member to oscillate at a natural frequency of approximately 1 Hz.

8. A bed construction for a moving vehicle in accordance with claim 2 wherein said movable frame comprises a sealed hollow portion which is connected to said gas spring and constitutes a reservoir therefor.

9. A bed construction for a moving vehicle in accordance with claim 8 wherein said reservoir has sufficient capacity to cause said gas spring to have a natural frequency of less than 2 Hz.

10. A bed construction for a moving vehicle in accordance with claim 8 wherein said reservoir has sufficient capacity to cause said gas spring to have a natural frequency of approximately 1 Hz.

* * * * *